United States Patent [19]
Ogasawara et al.

[11] Patent Number: 6,014,136
[45] Date of Patent: Jan. 11, 2000

[54] DATA PROCESSING APPARATUS WITH COMMUNICATION FUNCTION

[75] Inventors: Satoshi Ogasawara, Hanno; Masaru Sakata, Fussa, both of Japan

[73] Assignee: Casio Computer Co., Ltd., Tokyo, Japan

[21] Appl. No.: 08/930,717

[22] PCT Filed: Mar. 4, 1997

[86] PCT No.: PCT/JP97/00649

§ 371 Date: Sep. 30, 1997

§ 102(e) Date: Sep. 30, 1997

[87] PCT Pub. No.: WO97/33405

PCT Pub. Date: Sep. 12, 1997

[30] Foreign Application Priority Data

Mar. 5, 1996 [JP] Japan .................................. 8-073143

[51] Int. Cl.⁷ ...................................................... G06F 13/00
[52] U.S. Cl. .......................... 345/331; 345/332; 709/205
[58] Field of Search ...................................... 345/330, 329, 345/331, 332, 334, 339; 395/200.35; 709/205

[56] References Cited

U.S. PATENT DOCUMENTS 5,337,407  8/1994  Bates et al. ........................... 345/331
5,392,400  2/1995  Berkowitz et al. ............... 395/200.33
5,724,508  3/1998  Harple, Jr. et al. ............... 395/200.35
5,764,916  6/1998  Busey et al. ....................... 395/200.57

FOREIGN PATENT DOCUMENTS

WO 93/08522  4/1993  WIPO .
WO 95/10090  4/1995  WIPO .

*Primary Examiner*—Raymond J. Bayerl
*Assistant Examiner*—Sy D. Luu
*Attorney, Agent, or Firm*—Frishauf, Holtz, Goodman, Langer & Chick, P.C.

[57] ABSTRACT

When chat is performed with remote persons by using a personal computer communication service, even if the conversation data is displayed in a disordered chat style, a display having good visible readability can be performed such that conversation data of the persons who participate the chat are independently displayed in specific styles. For example, when the contents of the communication buffer in which all of the conversational data are stored are transferred to the storage device as a file, it is determined whether the data is transmission data or reception data. If the data is reception data, predetermined modification information, such as an inverted display, is added and the data is then stored in the file. When the contents of the file are output, the reception data is modified according to the modification information and then output.

6 Claims, 8 Drawing Sheets

(EXAMPLE OF VOID DISPLAY)

A > HOW ARE YOU ?

B > FINE, THANKS.

A > WELL, AS FOR THAT MATTER....

B > WHAT DO YOU MEAN BY "THAT MATTER"?

A > WHEN I SAY "THAT MATTER," IT MEANS ONLY ONE THING.

B > WHAT DOES "ONLY ONE THING" MEANS ?

(EXAMPLE OF VOID DISPLAY)

A > HOW ARE YOU ?

B > FINE, THANKS.

A > WELL, AS FOR THAT MATTER....

B > WHAT DO YOU MEAN BY "THAT MATTER"?

A > WHEN I SAY "THAT MATTER," IT MEANS ONLY ONE THING.

B > WHAT DOES "ONLY ONE THING" MEANS ?

FIG.5

MESSAGE 11/11 FROM HANAKO

RETURN-PATH: ⟨HANAKO@wpgw⟩

SUBJECT: JAPAN ×U.S.A

TO: YAMATO@wpgw.rd.casi.co.jp

DATE: THU,7 SEP 95 12:50:04 JST

Cc: KYOTO@wpgw.rd.casi.co.jp

STATUS: RO

IT'S WHAT I TOLD YOU LAST,

OCTOBER 14, 1996 (SATURDAY) 15:00 KICKOFF
JAPAN FOOTBALL STADIUM

FIG.10

DATA PROCESSING APPARATUS WITH COMMUNICATION FUNCTION

TECHNICAL FIELD

The present invention relates to a data processing apparatus which is capable of transmitting or receiving message data through a communication network.

BACKGROUND ART

In recent years, communication networks have been developed, and, as communication services, not only conventional public telephone services but also various communication services provided by communication service companies have established. If a personal computer user signs up with a personal computer communication service company, for example, CompuServe, Inc. or America Online, Inc., he/she can receive various communication services such as E mail or teleconferencing, information services for receiving specific information such as news or weather forecasts, and transaction services for buying products, or making airline or hotel reservations. Therefore, a large number of users sign up with communication service companies.

By using these communication services, a person can speak with distant persons using keyboards, and can enjoy chatting in real time on display screens. In a personal computer communication chat, conversation is performed in a considerably rough style with "speak" feeling. In addition, the chat is performed at an ordinary conversation speed. Therefore, the contents of interesting conversation by chat are stored in a file of a personal computer, and the stored conversation data is read from the file to be displayed or printed. In this case, a disordered display state is obtained if the stored conversation data is displayed or printed as it is, and it is very difficult to discriminate the speakers of the conversation data, thereby degrading visible readability.

DISCLOSURE OF THE INVENTION

It is an object of the present invention to provide a data processing apparatus with a communication function whereby a speaker of conversation data can be easily discriminated on an output of the conversation data.

It is another object of the present invention to provide a data processing apparatus with a communication function whereby a speaker of conversation data can be easily discriminated depending on a communication history.

It is still another object of the present invention to provide a data processing apparatus with a communication function whereby a predetermined data can be easily discriminated from the conversation data.

According to the present invention, there is provided a data processing apparatus which can be connected to a communication network, comprising means for determining whether data is transmission data or reception data, and output means for adding specific modification to at least one of the transmission data and the reception data to output the data with the specific information.

According to the present invention, there is provided another data processing apparatus which can be connected to a communication network, comprising means for determining whether predetermined data is included in reception data, and output means for, when the reception data is output, performing a predetermined modification to the predetermined data included in the reception data.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 shows an example of display of communication data in the first embodiment;

FIG. 10 shows an example of display of communication data in the third embodiment.

BEST MODE OF CARRYING OUT THE INVENTION

A preferred embodiment of a data processing apparatus according to the present invention will now be described with reference to the accompanying drawings.

The first embodiment of the data processing apparatus will be described below with reference to FIGS. 1 to 5.

Figure 1:
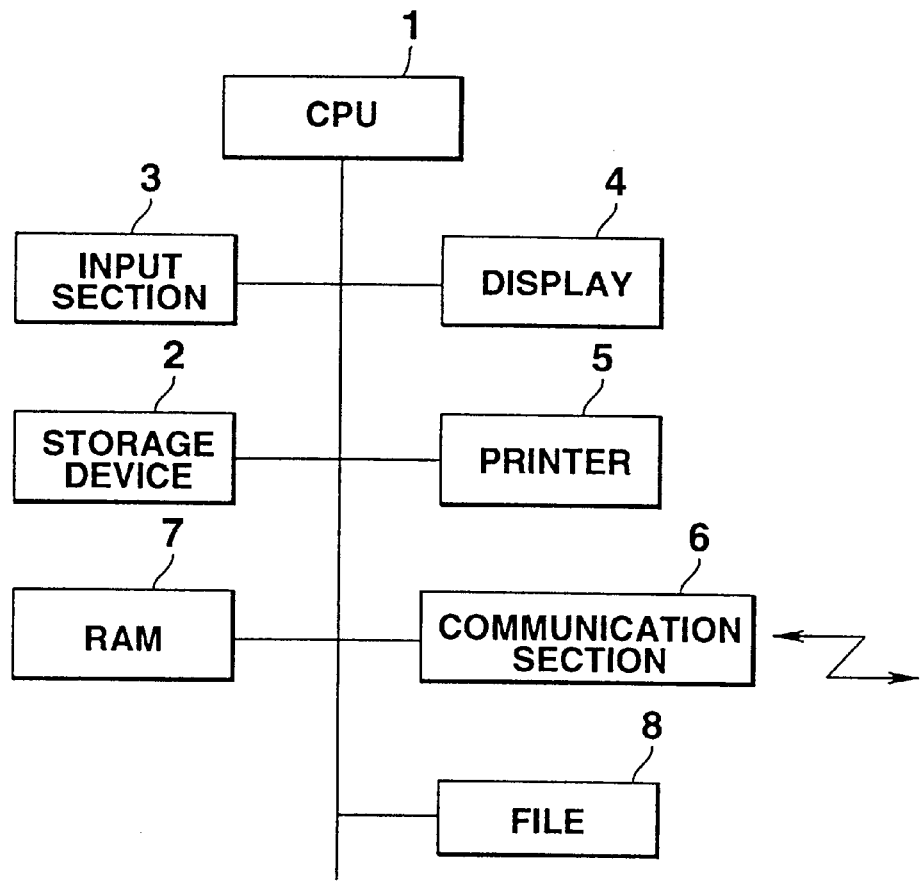
FIG. 1 shows a basic arrangement of a data processing apparatus with communication function.

FIG. 1 is a block diagram of the first embodiment. The data processing apparatus may be a personal computer or a word processor which can be connected to a communication network through a communication circuit such as a public communication circuit, a private communication circuit, or the like.

A CPU 1 is a central processing unit which starts basic software such as an operation system ordinarily installed in the data processing apparatus, and various application software such as a word processor software and communication software to control the entire operation of the data processing apparatus.

An input section 3 constituted by a keyboard or the like, a display 4, a printer 5, and a communication section 6 constituted by a modem or the like for connection to a communication circuit are connected to the CPU 1 as input/output peripheral devices thereof. The CPU 1 controls the input/output operations of these sections. A storage device 2, a RAM (Random Access Memory) 7, and an electronic file 8 are connected to the CPU 1 as basic constituent elements.

The storage device 2 comprises a storage medium in which a program, data, or the like are stored in advance. The storage medium is formed of a magnetic or optical storage medium or a semiconductor memory. The storage medium may be fixedly arranged on the storage device, or may be detachably arranged on the storage device.

The program, the data, and the like stored in the storage medium may be received from another apparatus connected to the storage medium through a communication circuit or the like and then stored. In addition, another storage device having the storage medium may be connected to another apparatus and the program, the data, and the like stored in the other storage device may be used by the present data processing apparatus through the communication circuit.

When the data processing apparatus is operated in a word processor mode, document data input from the input section 3 is displayed on a display screen of the display 4 as a text document, and is stored in a text region memory (not shown) in the RAM 7. The contents of the text memory are printed by the printer 5 in response to a printing command, or are stored or registered in the file 8 in response to a storage command.

When the data processing apparatus is operated in a communication mode, the communication section 6 transmits data such as an ID number and a password of a communication service company which is input from the input section 3 to the communication service company through a public communication circuit. With this access, circuit connection to the communication service company is established.

After the circuit connection is established, when the apparatus receives message data transmitted from a destination side through the communication circuit, the CPU 1 writes the reception data to a communication buffer 7-1 in the RAM 7. When the apparatus transmits message data input from the input section 3 to the destination side through the communication circuit, the transmission data is written in the communication buffer 7-1 in the RAM 7, and is also written in an input/save buffer 7-2 in the RAM 7.

Figure 2:
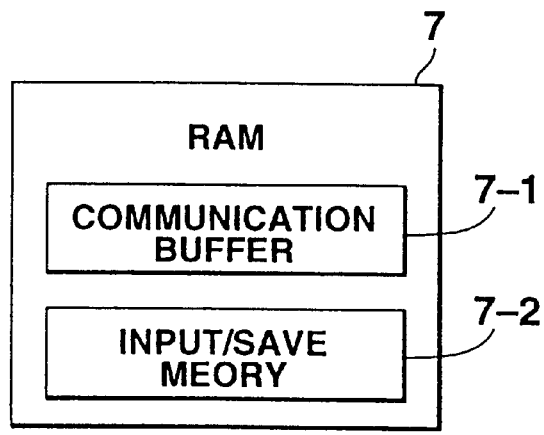
FIG. 2 shows the details of a RAM (Random Access Memory) 7 in the first embodiment.

As shown in FIG. 2, the RAM 7 is constituted by the communication buffer 7-1 and the input/save buffer 7-2. The communication buffer 7-1 sequentially stores the reception data and the transmission data in a transmission/reception order, and stores the reception data and the transmission data in conversation style. The input/save buffer 7-2 stores input data from the input section 3, i.e., transmission data, in a transmission order.

When the CPU 1 stores data stored in the communication buffer 7-1 in the file 8, data stored in the communication buffer 7-1 and data stored in the input/save buffer 7-2 are compared with each other to determine whether the data is transmission data or reception data. The data which coincides with the data stored in the input/save buffer 7-2 are determined as the transmission data input from the input section 3, and the data which does not coincide with the data stored in the input/save buffer 7-2 are determined as the reception data transmitted from the destination apparatus. If the data is the reception data, predetermined modification information is added and then stored in the file 8. When the transmission/reception data are read from the file 8 and then displayed or printed, display processing or printing processing on the basis of the modification information added to the data is performed on the reception data.

Figure 3:
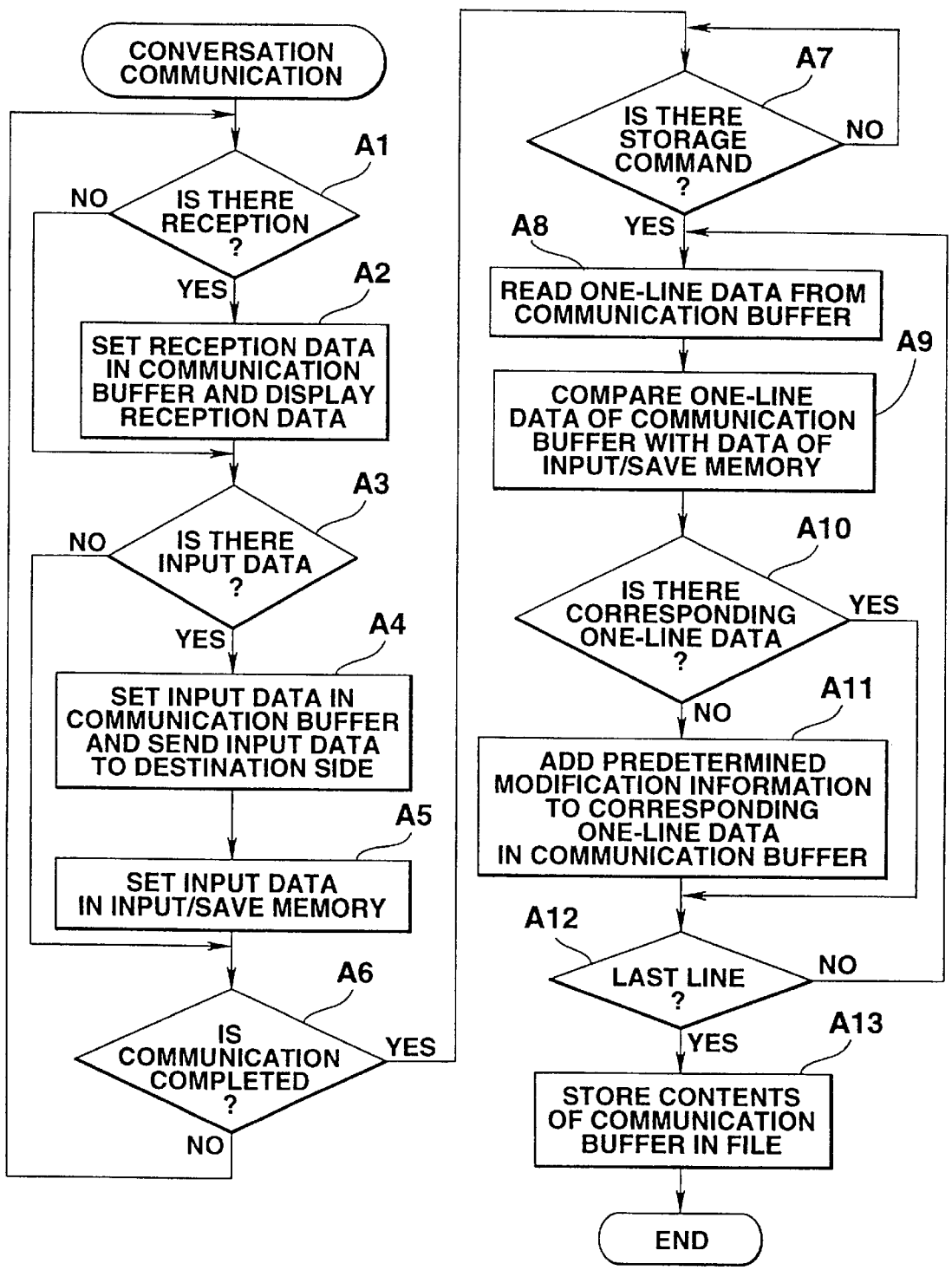
FIG. 3 is a flow chart showing a main operation in communication according to the first embodiment.

The entire operation of personal computer communication performed by one-to-one chat will be described below with reference to the flow chart in FIG. 3. A program for realizing the function described in this flow chart is stored in the storing medium as a program code which can be read by the CPU 1.

Circuit connection to an accessed specific service company is established to require a chat service. When data is transmitted from an unspecified subscriber of the specific communication service company (step A1), the reception data is written in the communication buffer 7-1 and is displayed on the display screen of the display (step A2). It is determined at step A3 whether transmission data is input from the keyboard (not shown) of the input section 3.

If YES at step A3, the input data (transmission data) is written in the communication buffer 7-1 and transmitted to the destination side through the modem of the communication section 6 in response to a transmission command (step A4). The input data is also written in the input/save buffer 7-2 (step A5). Steps A1 to A5 are repeated until the destination or the receiver outputs a communication completion command upon completion of the conversation (step A6).

When the communication completion command is output, chat communication is completed, and a standby state is set until a storage command is input from the input section 3 (step A7). Note that the storage command may be automatically generated upon completion of communication.

When the storage command is output, of the data stored in the communication buffer 7-1, one-line data on the display is read from the start line (step A8), and the one-line data is compared with transmission data stored in the input/save buffer 7-2 (step A9).

Figure 4:
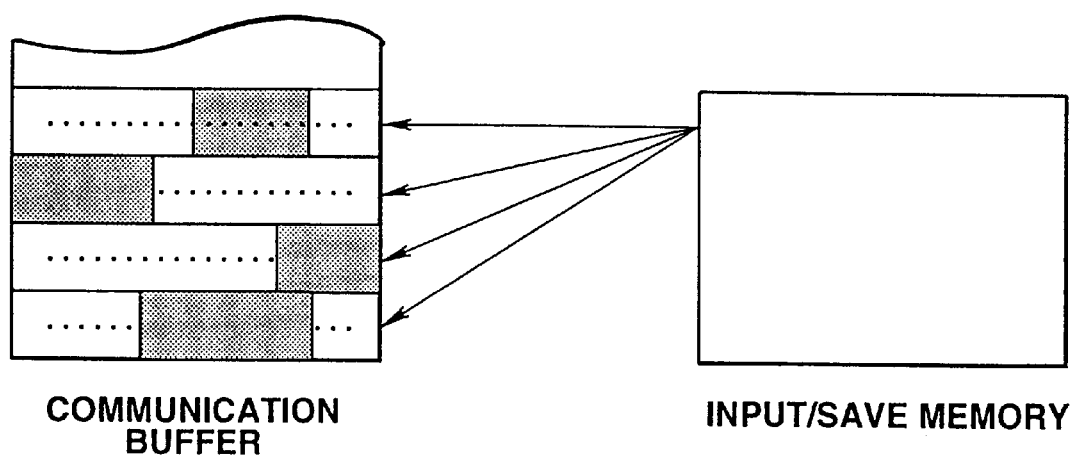
FIG. 4 shows an operation for detecting reception data in data stored in a communication buffer 7-1 with reference to the contents of an input/save memory 7-2 according to the first embodiment.

FIG. 4 shows this comparing operation. As a result, if the input/save buffer 7-2 stores data which coincides with the one-line data read from the communication buffer 7-1, the one-line data is determined as the input data (transmission data). If the input/save buffer 7-2 does not store data which coincides with the one-line data read from the communication buffer 7-1, the data is determined as the reception data (step A10).

When the one-line data is determined as the reception data, the one-line data has added thereto predetermined line data modification information which is set in correspondence with all the reception data.

When the storage command for storing a chat record in the file 8 is input, a list of line data modification information such as void (inverted display), display luminance, color information, or half-tone dot meshing is displayed in a menu screen and a desired line data modification information is selected.

On the other hand, when it is determined at step A10 that the one-line data is input data, i.e., transmission data, the process at step A11 is skipped. Steps A8 to A11 are continuously repeated every line in the communication buffer 7-1, and selectively set modification information is added to every line of the reception data in the communication buffer 7-1.

It is determined at step A12 that the one-line data having the modification information added thereto is the last line. If YES at step A12, all the contents of the communication buffer 7-1, i.e., the chat record are stored or registered in the file 8 together with a file name of this chat conversation (step A13).

In the state in which the chat record is stored in the file 8 together with the file name as described above, when a chat display command is input, every line data is read from the file 8 based on the chat file name, a modification process corresponding to the modification information serving as attribute data of the one-line data is performed for the reception data. In this manner, a display screen shown in FIG. 5 can be obtained in which the reception data is displayed with a modification process, in this case, an inverted (void) display mode.

According to the data processing apparatus of the first embodiment, even if the chat conversation data of the operator (transmission data) and the data of the destination (reception data) are displayed in a conversation style, the message line of a given speaker is displayed with a modification to distinguish same from the message line of another speaker. Therefore, the conversation data of both the persons can be easily discriminated from each other. Thus, good visible readability can be maintained over a long time, even in a disordered conversation.

In the above embodiment, the one-to-one chat between two persons is exemplified. However, the present invention can be applied to a case wherein chat is performed among a plurality of persons in the same manner as described above. In this case, different line data modification information are added to the reception data from the respective destinations.

Further, although modification information is added to the reception data when the contents of the communication buffer 7-1 is registered in the file 8, the modification information may be added when the received data is written in the communication buffer 7-1.

Other embodiments of the data processing apparatus according to the present invention will be described. The same portions as those of the first embodiment will be indicated in the same reference numerals and their detailed description will be omitted.

A second embodiment of the present invention will be described below with reference to FIGS. 6 and 7.

In the second embodiment, different color series are assigned to reception data transmitted from different destinations of chat conversation in personal computer communication and the reception data are color-displayed with color shades corresponding to the number of past chats.

Figure 6:
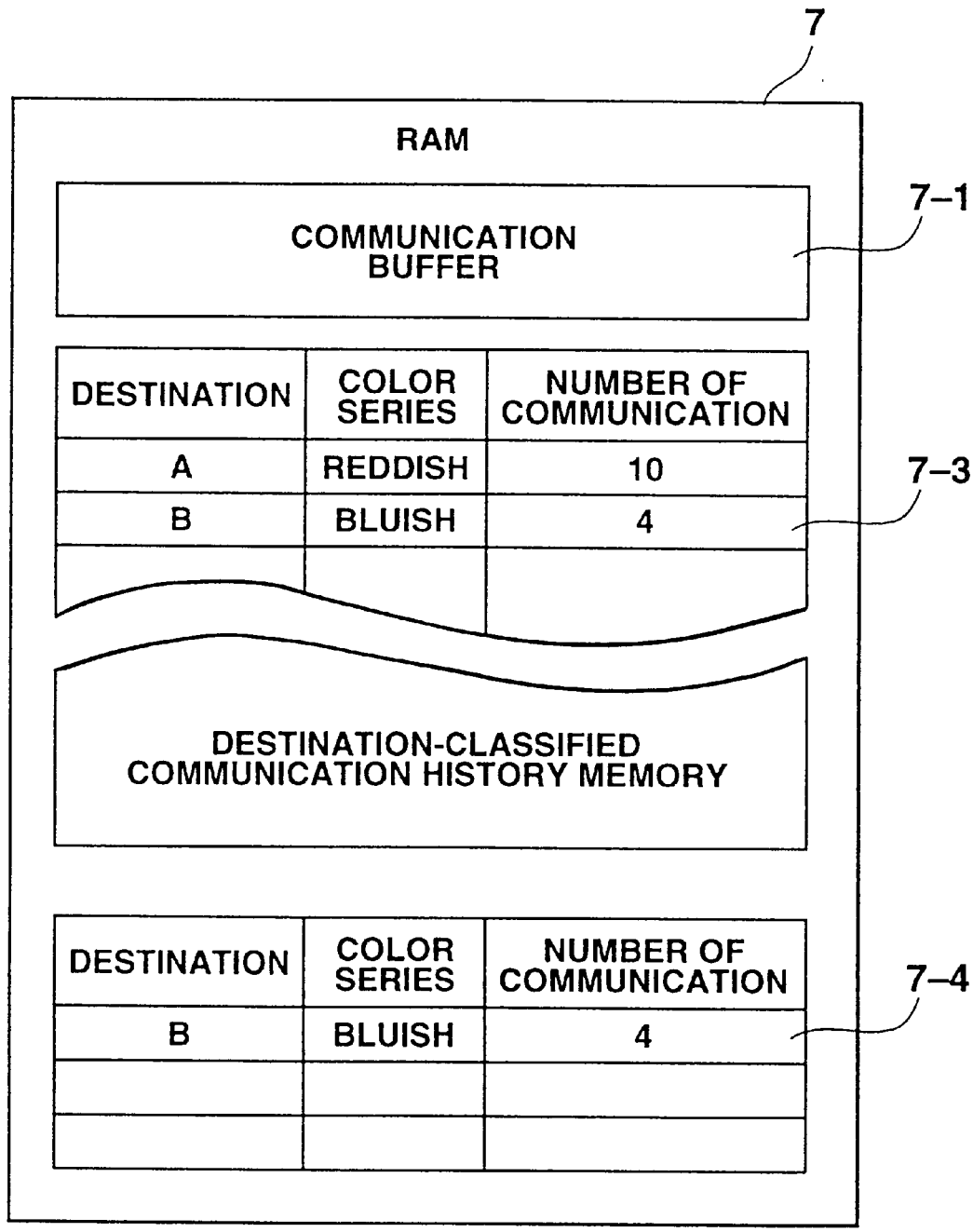
FIG. 6 shows the details of a RAM 7 in the second embodiment.

FIG. 6 shows the contents of a RAM 7 in the second embodiment. The RAM 7 is constituted by a communication buffer 7-1, a destination-classified communication history memory 7-3, and a current chat memory 7-4. The destination-classified communication history memory 7-3 indicates a color series information assigned to each chat destination and the number of communications information. The current chat memory 7-4 is linked to the destination-classified communication history memory 7-3 and indicates the name of destinations which are now performing the chat, color shade information assigned to the name of the destinations, and the number of communications.

Figure 7:
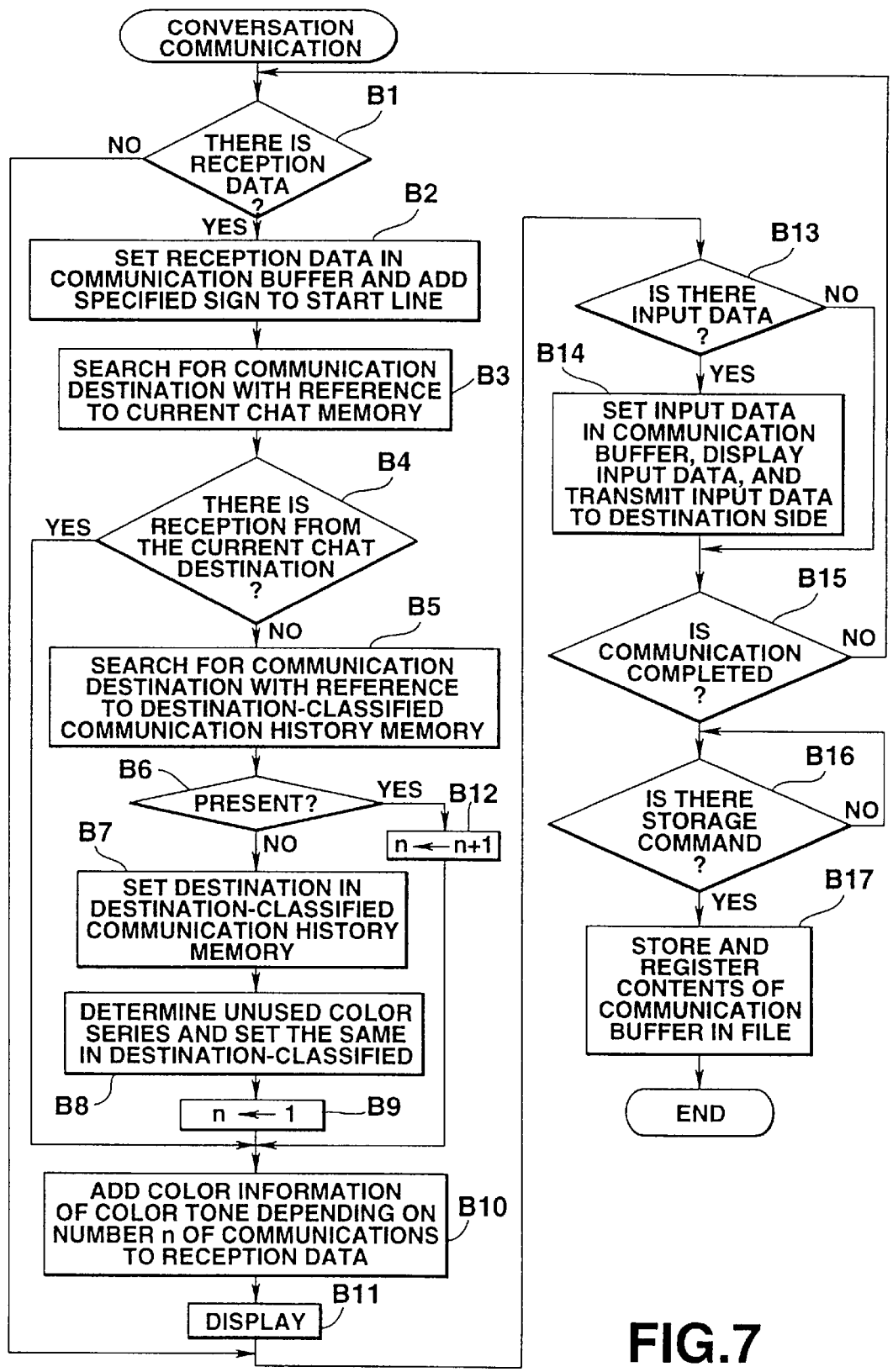
FIG. 7 is a flow chart showing a main operation in communication according to the second embodiment.

FIG. 7 is a flow chart showing a main operation of the data processing apparatus which is performing chat conversation.

Circuit connection to an accessed specific service company is established to perform a chat conversation. In this state, when data including a handle name is received from a subscriber or subscribers of the specific communication service company (step B1), the CPU 1 divides the reception data in units of lines, adds a specific symbol for denoting the divided line, for example "<" or "|", to the top of each line, and writes this reception data with the symbol in the communication buffer 7-1 (step B2). The current chat memory 7-4 is searched for a destination name (step B3). It is determined at step B4 whether the reception data is received from the destination which is currently chatting.

When, in the current chat memory 7-4, there is a destination name which coincides with the reception handle name, the destination name is determined as a destination which is currently chatting. Color information of color shade following the number of communications corresponding to the destination name is added to the reception data (step B10), and the reception data following the added color information is color-displayed (step B11).

If there is no reception handle name in the current chat memory 7-4, the CPU 1 searches for a communication destination with reference to the destination names in the destination-classified communication history memory 7-3 (step B5). As the result of searching, if, in the destination-classified communication history memory 7-3, there is no reception handle number (step B6), the reception handle name is set in the destination-classified communication history memory 7-3 as a new chat destination which has never performed chat (step B7), and the color series information set in the destination-classified communication history memory 7-3 is compared with color information series information memory (not shown) stored in the storage device 2 to select an unused color series. The selected color series information is set in the destination-classified communication history memory 7-3 in correspondence with the new handle name (step B8), and the number of communications 1 is set in correspondence with the new handle name and color series information (step B9).

On the other hand, if in the destination-classified communication history memory 7-3, there is a destination name which corresponds to a handle name of an originating source for the reception data, i.e., if the destination is a destination which had performed chat, an updating process is performed such that "1" is added to the communication number information n of the destination item in the destination-classified communication history memory 7-3 (step B12). When the destination-classified communication history memory 7-3 is updated, on the basis of the updated contents, the current chat memory 7-4 is updated.

The number n of communications corresponding to the received destination name is read from the current chat memory 7-4, the color information of color shade following the number n of communications is read from a color information memory (not shown) which is stored in the storage device 2, and then added to the reception data (step B10). A modification process is performed to the reception data according to the color information to perform a color display (step B11).

Here, if data is input from a keyboard (not shown) of the input section 3 (step B13), input data, i.e., transmission data, is saved in the communication buffer 7-1 to be displayed and printed, and a process for transmitting the input data to the destination through a communication section 6 is performed (step B14). Here, it is checked by a communication completion command for declaring completion of communication whether chat conversation is completed (step B15). If NO at step B15, the flow returns to step B1, and the operations at steps B1 to B15 are repeated.

When the completion of communication is detected, it is determined at step B17 whether a command for storing the chat record is input. When there is a storing command, the process in which all the contents of the communication buffer 7-1 are stored in the file 8 together with the chat file name.

As described above, conversation data of chat in personal computer communication are assigned to color series for each destination, and the color shade is changed depending on the number of communications to the destination. Therefore, conversation destinations are respectively distinguished by the color series of the display or print state of the conversation record, so that it can be easily determined by the color shade whether the conversation destination is a known regular or an unknown person.

In the above embodiment, although a color series is assigned to each destination to identify a chat destination, for example, a half-tone dot meshing or the like may be assigned to each destination.

A third embodiment of the present invention will be described below with reference to FIGS. 8 to 10.

Figure 8:
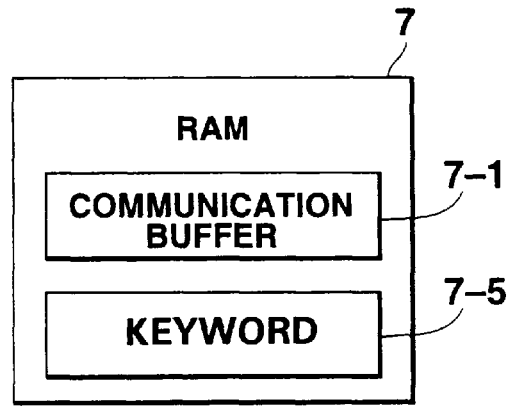
FIG. 8 shows the details of a RAM 7 in the third embodiment.
Figure 9:
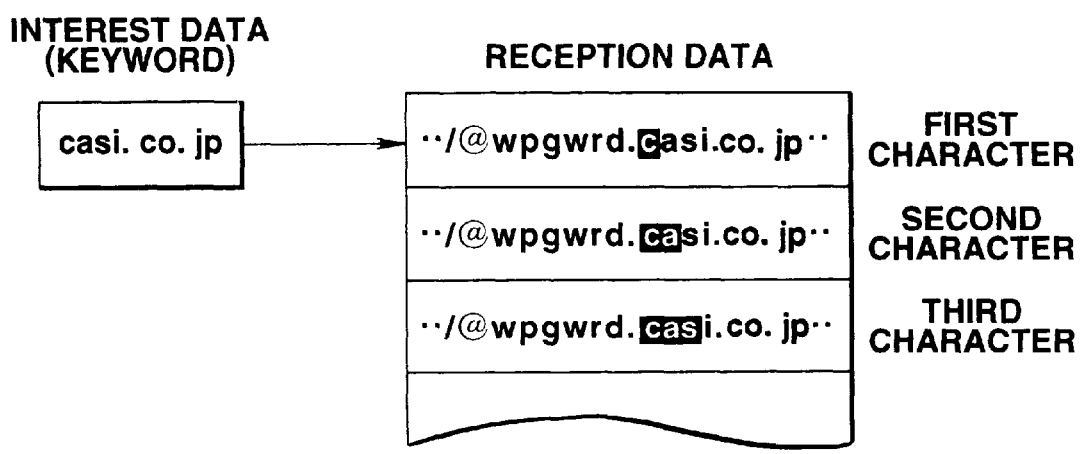
FIG. 9 shows an operation for comparing a keyword with reception data in the third embodiment.

FIG. 8 shows the arrangement of a RAM 7 constituted by a communication buffer 7-1 and a keyword register 7-5. An arbitrary character string can be set in the keyword register 7-5.

When the contents of the communication buffer 7-1 which stores chat conversation data by using a chat service of a communication service company in personal computer communication are displayed, printed, or stored in the file 8, the CPU 1 sequentially compares character string data set in the keyword register 7-5 with character string data of E-mail data in the communication buffer 7-1 to determine whether a character string which coincides with the character string in the keyword register 7-5 is stored in the communication buffer 7-1. Here, FIG. 9 shows this comparing process. That is, since "casi.co.jp " is set as a character string in the keyword register 7-5, by using this character string as a keyword, the characters in the character string in the communication buffer 7-1 are compared one by one. In this case, data to be compared are all the character data stored in the communication buffer 7-1. If reception data or transmission data includes a character string which coincides with the set keyword character string, predetermined modification information is added to the corresponding character string portion. FIG. 10 shows a display obtained when void is used as modification information.

When only a specific character string is set in advance as a keyword, the display state of the specific character string is modified in the data in a chat conversation. Therefore, the character string can be instantaneously identified even in a disordered display state, and good visual readability can be obtained.

In the embodiment, although a single character string is set as a keyword in the keyword register 7-5, a plurality of keywords may be set. The timing for setting a keyword, moreover, is not limited to a specific timing. For example, when the contents of the communication buffer 7-1 are stored in the file 8, a keyword may be set while a displayed conversation is checked.

Industrial Applicability

According to the present invention, even in conventional communication data, the respective speech data of a plurality of persons who participate in the conversation can be discriminated from each other. In addition, a specific character string can be easily identified in the communication data.

We claim:

1. A data processing apparatus capable of performing chat communication among a plurality of parties via a communication network, said data processing apparatus comprising:

means for discriminating chat communication parties;
means for counting a number of chat communications of each of the parties; and
modifying means for performing a specific modification on reception data from a predetermined party based on the counted number of chat communications of the predetermined party, whereby the reception data from the predetermined party can be output in a distinguishing manner.

2. The data processing apparatus according to claim 1, wherein said modifying means comprises means for modifying a color of the reception data from the predetermined party based on the counted number of chat communications of the predetermined party.

3. The data processing apparatus according to claim 1, further comprising chat history storing means for storing the counted number of chat communications of each of the parties, and specific modifications for each of the parties.

4. The data processing apparatus according to claim 3, further comprising means for detecting a new chat communication party, and means for registering the new party and a new specific modification in said chat history storing means.

5. A data processing apparatus capable of performing chat communication via a communication network, said data processing apparatus comprising:

a first memory for storing chat data during chat communication;
a second memory for storing one of transmission data and reception data during chat communication;
modifying means for: (i) reading out the chat data from said first memory, (ii) comparing the read out chat data with the data stored in said second memory to determine whether the read out chat data is the transmission data or the reception data, (iii) modifying one of the transmission data and the reception data, and (iv) storing the transmission data and the reception data, one of which has been modified, into a third memory; and
output means for outputting the transmission data and the reception data read from said third memory in a manner such that the transmission data and the reception data can be distinguished from each other.

6. The data processing apparatus according to claim 5, wherein said modifying means comprises means for modifying a color of one of the transmission data and the reception data.

* * * * *